United States Patent [19] [11] Patent Number: 4,730,634
Russell [45] Date of Patent: Mar. 15, 1988

[54] METHOD AND APPARATUS FOR CONTROLLING PRODUCTION OF FLUIDS FROM A WELL

[75] Inventor: Clifton R. Russell, Odessa, Tex.

[73] Assignee: Amoco Corporation, Chicago, Ill.

[21] Appl. No.: 876,311

[22] Filed: Jun. 19, 1986

[51] Int. Cl.⁴ .......................................... B01D 19/00
[52] U.S. Cl. ...................................... 137/1; 137/173; 55/164; 55/215
[58] Field of Search .................. 137/174, 173; 55/164, 55/165, 166, 167, 168, 169, 189, 213, 215, 216

[56] References Cited

U.S. PATENT DOCUMENTS 2,997,053  8/1961  Walker ............................ 137/173 X
3,202,167  8/1965  De Young ......................... 137/173
3,314,219  4/1967  Griffin ............................. 55/167
3,416,547 12/1968  Glenn .............................. 55/167 X
3,815,329  6/1974  Rolfsen ........................... 55/189 X Primary Examiner—Alan Cohan
Attorney, Agent, or Firm—Scott H. Brown; Fred E. Hook

[57] ABSTRACT

Method and apparatus for controlling production of fluids from a well. A transfer vessel receives fluids produced from an oil and gas well which separate into liquid and gas phases in the vessel. A gas pipeline and a liquid pipeline are provided for transporting produced gas and liquid, respectively, from the vessel. A gas pressure control valve is provided in the gas pipeline. A bypass conduit having a bypass valve therein forms a shunt around the pressure control valve in the gas pipeline. In the event of an abnormal rise of liquid in the vessel, the bypass valve closes thereby increasing gas pressure in the vessel to a pressure sufficient to boost liquid therefrom into an emergency vessel drain.

18 Claims, 1 Drawing Figure

METHOD AND APPARATUS FOR CONTROLLING PRODUCTION OF FLUIDS FROM A WELL

BACKGROUND OF THE INVENTION

1. Field of the Invention

The present invention relates to methods and apparatus for controlling production of fluids from a well and, more particularly, to such methods and apparatus wherein produced well fluids are introduced into a vessel wherein the fluids separate into gas and liquid phases.

2. Setting of the Invention

A typical arrangement for handling fluids which are produced from an oil and gas well includes a transfer vessel in which the produced fluids separate into their liquid and gas phases. The transfer vessel includes an outlet at the upper end thereof which is connected to a gas sales line via a pressure control valve. The lower end of the tank includes an outlet connected to a pump for pumping the liquids from the transfer vessel for processing and/or storage. A liquid level monitor senses the level of the liquid in the tank and turns the pump on when the vessel liquid rises above a preselected level and shuts the pump off when the vessel liquid falls below a preselected level.

In the event of a transfer pump failure, the liquid level in the tank rises above the upper preselected level at which the pump is normally activated. An emergency condition sensor detects the abnormal rise in liquid level and opens a gas-actuated valve which is connected to an emergency liquid drain on the vessel. After the emergency valve opens, the gas pressure in the tank boosts the liquid into the emergency drain, which is connected to a set of storage tanks for temporarily storing the produced liquids.

It should be noted that there must be sufficient gas pressure in the vessel to force the liquid in the vessel into the emergency drain. The pressure control valve in the gas sales conduit is adjusted to maintain sufficient pressure to boost liquids into the tank in the event of a pump failure. The gas pressure in the vessel is communicated to the wellbore via the line which provides the produced well fluids to the vessel. A problem exists in that when the pressure in the transfer vessel is maintained at a level sufficient to drain liquid therefrom in the event of a pump failure, the pressure is also sufficient to slow the flow of fluid production from the well. When the well pressure is sufficiently low, the vessel backpressure which is communicated to the well can significantly retard the flow of fluids form the well into the transfer vessel.

There exists a need for a method and apparatus for controlling production of fluids from a well in which the backpressure communicated to the well from the transfer vessel is significantly reduced.

SUMMARY OF THE INVENTION

The instant invention comprises a method and apparatus for controlling production of fluids from a well of the type having produced fluids introduced into a vessel in which the fluids separate into liquid and gas phases with the vessel having a gas conduit for transporting gas therefrom. The gas pressure in the vessel is maintained at substantially the same level as the pressure in the conduit. The liquid level in the vessel is monitored and when it increases above a preselected level, the gas pressure in the vessel is increased to a level sufficient to boost the liquids from the vessel into an emergency drain.

DESCRIPTION OF THE DRAWING

The drawing is a partially schematic view of a transfer vessel and its associated controls constructed in accordance with the instant invention.

DETAILED DESCRIPTION OF THE PREFERRED EMBODIMENT OF THE METHOD AND APPARATUS OF THE INSTANT INVENTION

Figure 1:
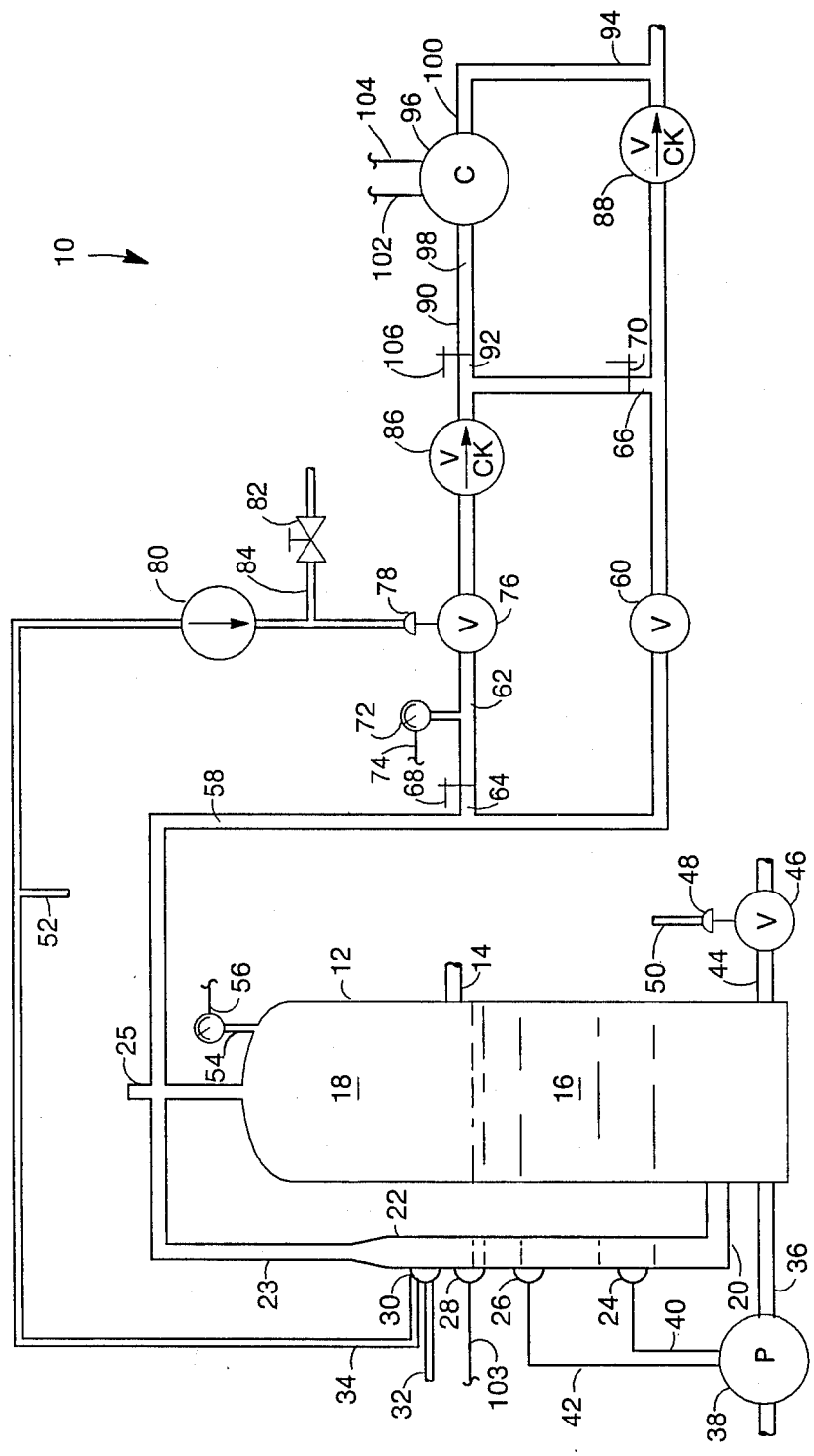

The present invention provides a method and apparatus for controlling production of fluids from a well. A vessel includes a gas conduit for transporting gas therefrom with the gas conduit having a pressure control valve therein. A bypass conduit has one end connected upstream from the pressure control valve and the other end connected downstream therefrom and includes a bypass valve for communicating pressure downstream of the pressure control valve to the transfer vessel. When the liquid level in the transfer vessel rises above a preselected level, the bypass valve closes thereby increasing the gas pressure in the vessel to a level sufficient to boost the liquids therein into an emergency drain.

Referring now to the drawing, indicated generally at 10 is a system for controlling production of fluids from a well which is constructed in accordance with the instant invention. Included in system 10 is a tank or vessel 12. Vessel 12 is connected to a flow line or a pipeline 14 through which produced fluids from an oil and gas well (not shown) flow into vessel 12. It is to be appreciated that pipeline 14 may not be in direct communication with the production tubing and casing of a well but rather may communicate with a header system which in turn receives flow lines from the production tubing and casing of a number of wells. In addition, the header system may first provide the produced fluids to a commercially available test vessel which in turn provides the fluids to vessel 12.

In any event, when the produced fluids flow into vessel 12 via pipeline 14, they separate into a liquid phase 16, comprised of oil and in some instances water, and a gas phase 18 in the upper portion of the vessel.

Vessel 12 communicates via pipe 20 with a control boot 22, such comprising an upright cylindrical column which receives liquid 16 through pipe 20 to the same level as liquid is received in vessel 12. The upper end of the control boot is connected to a pipe 23 which in turn is connected to a pipe 25. Pipe 25 is mounted on top of vessel 12 and communicates with gas 18 in the vessel. Three commercially available electrical float switches 24, 26, 28 are mounted on control boot 22 and are actuated when the level of liquid 16 in the control boot rises to the level of the switch. A mechanical float valve 30 is also mounted on boot 22 and is operatively connected to conduits 32, 34. Conduit 32 is connected to a source of pressurized air (not shown). When the level of liquid 16 in the control boot rises to the level of float valve 30, the valve opens and provides communication between conduits 32, 34. The function and operation of switches 24, 26, 28 and valve 30 will be hereinafter more fully explained.

A pipeline 36, such being also referred to herein as a liquid conduit, provides fluid communication between the lower end of vessel 12 and a transfer pump 38 which pumps liquid 16 from the transfer vessel and provides it to the usual facility for processing and/or storage. Pump 38 is connected via electrical lines 40, 42 to float switches 24, 26, respectively. As fluids are provided via pipeline 14 into vessel 12, the level of liquid 16 in the vessel rises thus actuating switch 26 which starts pump 38 thereby lowering the level of liquid 16. When the level falls to switch 24, actuation of switch 24 stops pump 38 thereby permitting the liquid level to again rise. Thus, in normal steady state operation of system 10, the level of liquid 16 fluctuates between switches 24, 26.

Connected to the lower end of vessel 12 at about five feet higher than pipeline 36 is a pipeline 44, such as being referred to herein as a drain or emergency conduit. The other end of pipeline 44 (not shown) is connected to an emergency storage tank (also not shown). An emergency valve 46 is received in conduit 44 and is normally in a closed condition thus prohibiting flow in pipeline 44. Valve 46 may be opened by a gas actuated opening mechanism 48 which is operatively connected to a conduit 50. Opening mechanism 48 opens valve 46 responsive to pressurization of conduit 50 and maintains valve 46 in an open condition for so long as the conduit remains pressurized. When pressure is removed from conduit 50, valve 46 again resumes its normally closed condition. Conduit 50 is connected to and in fluid communication with a conduit 52, shown in the drawing directly above conduit 50, which in turn is in fluid communication with conduit 34.

A commercially available switchgauge 54 senses the pressure of gas 18 in vessel 12. The switchgauge is set to provide signals on electrical line 56 responsive to preselected pressures which are detected by the switchgauge. The connection of line 56 to the remainder of system 10 will be hereinafter more fully explained.

A gas conduit 58 is in communication with pipe 25 at the top of the vessel. The other end of gas conduit 58 is connected to a gas metering device (not shown) for calculating the volume of gas discharged from vessel 12. Conduit 58 includes therein a pressure control valve 60 which may be adjusted to variably restrict an orifice in the valve thereby creating a selected pressure drop across valve 60.

A bypass conduit 62 has an upper end 64 connected to conduit 58 and a lower end 66 also connected to conduit 58 downstream from valve 60. Manually operated butterfly valves 68, 70 are normally positioned to permit fluid flow in conduit 62; however, valves 68, 70 may be shut to isolate the bypass conduit from the remainder of the system for service and/or repairs.

A switchgauge 72 is mounted on conduit 62 and functions in substantially the same way as switchgauge 54. The electrical signals generated by switchgauge 62 responsive to detection of a preselected pressure in the bypass conduit are placed on electrical line 74 which is connected to an alarm system (not shown). Thus, switchgauge 72 is set to cause an alarm responsive to detection of the preselected pressure in the bypass conduit.

A normally open bypass valve 76 is received in the bypass conduit. Valve 76 is operatively connected to a gas actuated closing mechanism 78 which closes valve 76 thereby prohibiting flow in conduit 62 responsive to pressurization of conduit 34. Conduit 34 includes therein a check valve 80 which permits flow in conduit 34 only in the direction of the arrow. The check valve retains pressure in that portion of conduit 34 between check valve 80 and mechanism 78 even after pressure is released upstream from the check valve. A conduit 84 is connected to conduit 34 as shown and includes a manually operated bleeder valve 82 therein. When bleeder valve 82 is opened, the pressure in conduit 34 between mechanism 78 and check valve 80 is released thereby permitting valve 76 to resume its normally open condition.

Bypass 62 further includes therein a check valve 86 which permits flow only in the direction of the arrow. A similar check valve 88 is received in gas conduit 58 and likewise permits flow in the gas conduit only in the direction of the arrow.

A conduit 90 includes an upper end 92 connected to bypass conduit 62 as shown and lower end 94 connected to bypass conduit 62 as shown and a lower end 94 connected to conduit 58 downstream from check valve 88. Included in conduit 90 is a compressor 96 having an inlet 98 and an outlet 100.

Compressor 96 includes a pair of electrical control lines 102, 104 with electrical control line 102 being connected to electrical line 103 which is in turn connected to floating switch 28. Electrical line 104 is connected to electrical line 56 on switchgauge 54. Electrical line 102 provides a disabling signal to compressor 96 responsive to actuation of switch 28 by rising liquid 16 in the vessel. Control line 104 provides an on-off signal responsive to signals on electrical line 56. Switchgauge 54 may be set to generate a compressor-on signal when the pressure of gas 18 in the vessel falls within a preselected range. When a disabling signal is placed on electrical line 102 by float switch 28, the compressor will not turn on regardless of the signals appearing on electrical line 104.

A manually operated butterfly valve 106, like valves 68, 70, is normally in an open condition but may be closed to isolate portions of the system for service and/or repair.

In normal operation, each of butterfly valves 68, 70, 106 are in their open condition. Fluids are received via pipeline 14 into vessel 12 at which time the produced well fluids separate into liquid 16 and gas 18 phases. As the liquid level in vessel 18, and thus in control boot 22, rises, it ultimately switches float switch 26 which applies a signal to electrical line 42 thus energizing pump 38. The level of liquid 16 in the vessel lowers as the pump transfers the same to a processing and/or storage facility via pipeline 36. When the liquid level reaches float switch 24, a signal is applied to line 40 which deenergizes pump 38 thereby permitting the level of liquid 16 in the vessel to again rise. Thus, when system 10 is functioning normally, the level of liquid 16 in control boot 22, and accordingly in the vessel, fluctuates between switches 24, 26.

While the level of liquid 16 is so regulated, gas 18 in the vessel flows into pipe 25 and from there into gas conduit 58. In normal operation, valve 76 is in its open condition while valve 60 is set to restrict at least a portion of gas conduit 58. Thus, the gas may flow through bypass conduit 62 without a significant pressure drop.

When the pressure of gas 18 in vessel 12 rises above an upper preselected level set on switchgauge 54, a signal is generated on electrical line 56 which is communicated to compressor 96 via electrical line 104, which energizes compressor 96. Thus, gas flows through bypass conduit 62 into conduit 90, through the compressor and back to gas conduit 58 on the outlet side of the compressor. After the compressor runs for a while, the pressure of gas 18 in the vessel falls below a lower preselected level, also set on switchgauge 54, which generates a signal on electrical line 56 thus deenergizing compressor 96. With the compressor deenergized, gas flow is from bypass conduit 62 through valve 76, the lower end 66 of the bypass conduit and into gas conduit 58 on the upstream side of check valve 88. When and if the pressure of gas 18 in the vessel again rises to the upper preselected level on switchgauge 54 the compressor is again energized thus pumping gas as previously described. Check valve 88 prevents reverse flow of gas in conduit 58 when compressor 96 is energized.

A malfunction may prevent liquid 16 from being pumped away from the vessel in conduit 36. For example, a power outage, a failure of switch 26, a blockage in conduit 36, etc., would prevent transferring liquid 16 in the vessel therefrom via pipeline 36.

In the event of a malfunction such as described above, the level of liquid 16 in the vessel rises above float switch 26 and approaches float switch 28 as shown in the drawing. When the rising liquid actuates switch 28, a signal is provided on electrical line 103 to electrical line 102 on compressor 96 thus disabling compressor energization regardless of the pressure of gas 18 detected by switchguage 54. As the level continues to rise, float valve 30 is opened thus providing fluid communication between conduit 32 and conduit 34. Conduit 34 is thereby connected to the pressurized air source (not shown) and thereby actuates valve opening mechanism 48, thus opening valve 46, and valve closing mechanism 78, thus closing valve 76. With valve 76 closed and with compressor 96 prevented from energizing, flow of gas 18 from vessel 12 is in conduit 58 through valve 60. Valve 60 is set to restrict conduit 58 thereby causing a pressure increase on the upstream side of valve 60 which is communicated to vessel 12. Since the compressor is disabled by a signal from switch 28, the pressure increase in vessel 12 forces liquid 16 from the vessel into conduit 44 to the emergency storage tank. When the liquid level in the vessel drops beneath float valve 30, the valve closes thus isolating the pressure source connected to conduit 32 from conduit 34. However, valve 76 is maintained in a closed condition due to the action of check valve 80 in conduit 34 which maintains pressure in the conduit downstream from check valve 80. Bleeder valve 82 must be manually activated to release the pressure between check valve 80 and gas actuated closing mechanism 78 thereby permitting valve 76 to open.

When the level of liquid 16 in the vessel drops beneath valve 30, valve 46 closes due to the loss of pressure in conduit 50. Thereafter, as the liquid level again rises, valve 30 again opens thereby opening valve 46 and permitting additional fluid drainage from the transfer vessel.

When the pressure of gas 18 in vessel 12 rises, switchgauge 72 generates a signal on electrical conductor 74 which is provided to the alarm system for signaling a pressure increase in bypass conduit 62. This notifies someone of the malfunction which can then be remedied. Thereafter, bleeder valve 82 may be opened to release the pressure in conduit 52 between check valve 80 and gas actuated closing mechanism 78 thereby permitting valve 76 to resume its normally open condition.

System 10 permits gas conduit 58 to be maintained at substantially the same pressure as gas 18 in the vessel thereby reducing back pressure on the well which is communicated via pipeline 14. When back pressure is so reduced, fluids from the well flow more readily into vessel 12 and recovery of the same are enhanced. System 10 also maintains the capability to boost liquid from vessel 12 responsive to vessel gas pressure in the event of a malfunction.

It is to be appreciated that additions and modifications may be made to the embodiment of the method and apparatus disclosed herein without departing from the spirit of the invention which is defined in the following claims.

What is claimed is:

1. A method for controlling production of fluids from a well of the type having produced fluids introduced into a vessel in which the fluids separate into gas and liquid phases, said vessel having a gas conduit for transporting gas therefrom and a liquid conduit for transporting liquid therefrom, said gas conduit having a pressure control valve therein for controlling gas pressure in said vessel, said method comprising the steps of:

providing a bypass conduit having a first end connected upstream from said pressure control valve and a second end connected downstream from said pressure control valve, said bypass conduit having a bypass valve therein;

monitoring the level of liquid in said vessel;

maintaining said bypass valve in an open condition for so long as said liquid is below a preselected level; and closing said bypass valve when said liquid rises above said preselected level.

2. The method of claim 1 wherein said method further comprises the step of connecting a drain to said vessel for transporting liquid therefrom substantially simultaneously with the step of closing said bypass valve.

3. The method of claim 1 wherein said method further comprises the step of maintaining said bypass valve in a closed condition regardless of the level of liquid in said vessel.

4. The method of claim 1 wherein said method further comprises the step of:

connecting the inlet of a compressor to said gas conduit;

monitoring gas pressure in said vessel;

starting said compressor when said gas pressure rises above a preselected pressure; and stopping said compressor when said gas pressure falls below a preselected pressure.

5. The method of claim 4 wherein said method further comprises the step of disabling said compressor when the liquid in said vessel rises above a second preselected level, said second preselected liquid level being less than said first-mentioned preselected liquid level.

6. A method for controlling production of fluids from a well of the type having produced fluids introduced into a vessel in which the fluids separate into liquid and gas phases, said vessel having a gas conduit for transporting gas therefrom and a liquid conduit for transporting fluid therefrom, said method comprising the steps of:

maintaining the gas pressure in said vessel at substantially the same level as the pressure in said gas conduit;

monitoring the level of liquid in said vessel;

increasing the gas pressure in said vessel when said liquid rises above a preselected level; and providing fluid communication between said vessel and an emergency conduit when said liquid rises above a preselected level as when said liquid conduit is unable to provide liquid transportation.

7. The method of claim 6 wherein the step of increasing the gas pressure in said vessel when said liquid rises above a preselected level comprises the step of restricting said gas conduit.

8. The method of claim 6 wherein the step of increasing the gas pressure in said vessel when said liquid rises above a preselected level comprises the step of increasing the gas pressure in said vessel by an amount sufficient to boost vessel fluid into said emergency conduit.

9. The method of claim 6 wherein said method further comprises the steps of:
monitoring gas pressure in said vessel;
applying a pressure lower than that in said vessel to said gas conduit when said vessel gas pressure rises above a first preselected pressure; and
removing said lower pressure when said vessel gas pressure falls below a second preselected pressure.

10. The method of claim 9 wherein said method further includes the step of preventing said lower pressure from being applied to said gas conduit when said liquid rises above a preselected level.

11. An apparatus for controlling production of fluids from a well of the type having produced fluids introduced into a vessel in which the fluids separate into liquid and gas phases, said vessel having a gas conduit for transporting gas therefrom and a liquid conduit for transporting fluid therefrom, said apparatus comprising:
means for maintaining the gas pressure in said vessel at substantially the same level as the pressure in said gas conduit;
means for monitoring the level of liquid in said vessel;
means for increasing the gas pressure in said vessel responsive to said liquid rising above a preselected level, said increasing means being operatively connected to said monitoring means; and
means for providing fluid communication between said vessel and an emergency conduit when said liquid rises above a preselected level, said providing means being operatively connected to said monitoring means.

12. The apparatus of claim 11 wherein said means for increasing the gas pressure in said vessel responsive to said liquid rising above a preselected level comprises a valve in said gas conduit.

13. The apparatus of claim 11 wherein said apparatus further comprises:
a compressor having an inlet and outlet, said compressor inlet being connected to said gas conduit; and
means for monitoring gas pressure in said vessel, said gas pressure monitoring means being operatively connected to said compressor and including means for starting said compressor when said gas pressure rises above a preselected pressure and means for stopping said compressor when said gas pressure falls below a preselected pressure.

14. The apparatus of claim 13 wherein said apparatus further includes means for disabling said compressor when the liquid in said vessel rises above a second preselected level, said second preselected level being less than said first-mentioned liquid level, said disabling means being operatively connected to said means for monitoring the level of liquid in said vessel.

15. Apparatus for controlling production of fluids from a well of the type having produced fluids introduced into a vessel in which the fluids separate into gas and liquid phases, said vessel having a gas conduit for transporting gas therefrom, an emergency conduit for transporting liquid from said vessel, and a liquid conduit for transporting liquid therefrom, said gas conduit having a pressure control valve therein for controlling gas pressure in said vessel, said apparatus comprising:
a bypass conduit having a first end connected upstream from said pressure control valve and a second end connected downstream from said pressure control valve;
a bypass valve received in said bypass conduit for selectively permitting or prohibiting flow in said bypass conduit;
an emergency valve received in said emergency conduit for selectively permitting or prohibiting flow in said emergency conduit;
means for monitoring the level of liquid in said vessel; and
control means for substantially simultaneously closing said bypass valve and opening said emergency valve responsive to a rise of liquid in said vessel above a preselected level, said control means being operatively connected to said monitoring means.

16. The apparatus of claim 15 wherein said apparatus further includes a compressor having the inlet thereof connected to said bypass conduit downstream from said bypass valve and the outlet thereof connected to said gas conduit downstream from the junction of said bypass conduit with said gas conduit.

17. The apparatus of claim 16 wherein said apparatus further includes means for activating said compressor when the gas pressure in said vessel falls within a preselected range.

18. The apparatus of claim 17 wherein said apparatus further includes means for disabling said compressor when the level of liquid in said vessel rises above a preselected level.

* * * * *